(12) United States Patent
King et al.

(10) Patent No.: US 7,666,331 B2
(45) Date of Patent: *Feb. 23, 2010

(54) PHOTOCHROMIC ARTICLE

(75) Inventors: Eric M. King, Pittsburgh, PA (US); Kevin J. Stewart, Murrysville, PA (US)

(73) Assignee: Transitions Optical, Inc., Pinellas, FL (US)

( * ) Notice: Subject to any disclaimer, the term of this patent is extended or adjusted under 35 U.S.C. 154(b) by 77 days.

This patent is subject to a terminal disclaimer.

(21) Appl. No.: 11/458,498

(22) Filed: Jul. 19, 2006

(65) Prior Publication Data

US 2007/0045596 A1  Mar. 1, 2007

Related U.S. Application Data

(60) Provisional application No. 60/712,946, filed on Aug. 31, 2005.

(51) Int. Cl.
  *F21V 9/00* (2006.01)
  *G02B 5/02* (2006.01)
  *G02C 7/10* (2006.01)
  *G02F 1/361* (2006.01)
  *G03B 11/00* (2006.01)

(52) U.S. Cl. .................... 252/582; 252/586; 428/411.1; 428/412; 428/423.1; 428/423.7; 428/480; 428/522

(58) Field of Classification Search ................. 252/582, 252/586; 428/412, 522, 423.1, 411.1, 423.7, 428/447, 480
See application file for complete search history.

(56) References Cited

U.S. PATENT DOCUMENTS

| | | | |
|---|---|---|---|
| 4,556,605 A | 12/1985 | Mogami et al. | |
| 4,558,120 A | 12/1985 | Tomalia et al. | |
| 4,756,973 A | 7/1988 | Sakagami et al. | |
| 4,857,630 A | 8/1989 | Kim | |
| 5,136,014 A | 8/1992 | Figuly | |
| 5,183,862 A | 2/1993 | Figuly | |
| 5,270,402 A | 12/1993 | Figuly | |
| 5,276,110 A | 1/1994 | Zhou et al. | |
| 5,418,301 A | 5/1995 | Hult et al. | |
| 5,462,806 A | 10/1995 | Konishi et al. | |
| 5,645,767 A | 7/1997 | Van Gemert | |
| 5,658,501 A | 8/1997 | Kumar et al. | |
| 5,663,247 A | 9/1997 | Sorensen et al. | |
| 5,760,142 A | 6/1998 | Klee | |
| 5,910,375 A | 6/1999 | Parker et al. | |
| 6,025,026 A * | 2/2000 | Smith et al. | 427/316 |
| 6,060,001 A | 5/2000 | Welch et al. | |
| 6,093,777 A | 7/2000 | Sorensen et al. | |
| 6,127,505 A | 10/2000 | Slagel | |
| 6,225,404 B1 | 5/2001 | Sorensen et al. | |
| 6,280,838 B1 * | 8/2001 | Bernards et al. | 428/325 |
| 6,602,603 B2 | 8/2003 | Welch et al. | |
| 6,733,887 B2 | 5/2004 | Okoroafor et al. | |
| 6,889,735 B2 | 5/2005 | Frank et al. | |
| 7,189,456 B2 * | 3/2007 | King | 428/412 |
| 2002/0151652 A1 | 10/2002 | Adedeji | |
| 2003/0134132 A1 | 7/2003 | Winterton et al. | |
| 2003/0165686 A1 * | 9/2003 | Blackburn et al. | 428/412 |
| 2005/0168689 A1 * | 8/2005 | Knox | 351/163 |

FOREIGN PATENT DOCUMENTS

| | | | |
|---|---|---|---|
| EP | 1 238 995 A1 | | 9/2002 |
| EP | 1 295 919 A2 | | 3/2003 |
| WO | WO 00/64975 | * | 2/2000 |
| WO | WO 00/64975 | | 11/2000 |
| WO | WO 00/77070 A2 | | 12/2000 |
| WO | WO 02/22700 A2 | | 3/2002 |
| WO | WO 02/32982 A1 | | 4/2002 |
| WO | WO 02/057004 A1 | | 7/2002 |
| WO | WO 02/066541 A1 | | 8/2002 |
| WO | WO 03/001555 A1 | | 1/2003 |
| WO | WO 03/037998 A1 | | 5/2003 |
| WO | WO 03/058300 A1 | | 7/2003 |
| WO | WO 2005/095541 A1 | | 10/2005 |

OTHER PUBLICATIONS

Uchida et al, "General Strategy For The Systematic Synthesis Of Oligosiloxanes. Silicone Dendrimers"; Jo.Am.Chem.Soc., 1990, vol. 112, pp. 7077-7079.

U.S. Appl. No. 10/793,518, Photochromic Optical Article, filed Mar. 4, 2004.

* cited by examiner

*Primary Examiner*—Harold Y. Pyon
*Assistant Examiner*—Bijan Ahvazi
(74) *Attorney, Agent, or Firm*—Deborah M Altman; Frank P. Malleek

(57) ABSTRACT

Describes an article, e.g., an optical article such as a lens, in which the article includes (a) a rigid substrate, e.g., a transparent ophthalmic substrate, such as a thermoset or thermoplastic substrate, having at least one surface suitable for accommodating a photochromic coating, and (b) a transparent photochromic coating comprising dendritic polymeric acrylate, e.g., polyester acrylate, on at least a portion of said surface of the substrate, the coating comprising a photochromic amount of at least one photochromic material, e.g., an organic photochromic material.

13 Claims, No Drawings

PHOTOCHROMIC ARTICLE

CROSS-REFERENCE TO RELATED APPLICATIONS

This application claims priority to provisional patent application Ser. No. 60/712,946 filed Aug. 31, 2005, which is incorporated herein by reference.

FIELD OF THE INVENTION

The present invention relates to novel photochromic coatings and to articles to which such photochromic coatings have been applied. More particularly, the present invention relates to optical articles, e.g., ophthalmic articles such as ophthalmic lenses, having such a photochromic coating on a surface of the article.

BACKGROUND OF THE INVENTION

Photochromic articles have been prepared by incorporating photochromic materials within the article. This has been accomplished by blending photochromic material within one or more precursors of the article, as for example by incorporating a photochromic material within a polymerizable composition used to prepare the article. Another approach that has been suggested is to imbibe photochromic material into and below the surface of the article by conventional imbibition techniques, e.g., by thermal diffusion. Such articles are reported to have sufficient free volume within the article to allow photochromic material, e.g., organic photochromic material, to physically transform from what is usually a colorless form to a colored form when exposed to actinic radiation, and then revert to the original colorless form when the actinic radiation is removed.

There are however materials that are not susceptible to the foregoing methods. These materials are reported to have insufficient free volume within the matrix or body of the material, e.g., within the region just below the surface of the material, to allow their use for commercial photochromic applications. Such materials include conventional glass (in connection with organic photochromic materials); thermoset polymers, such as those prepared from compositions comprising polyol (allyl carbonate) monomers, notably allyl diglycol carbonate monomers, e.g., diethylene glycol bis(allyl carbonate), and copolymers thereof; thermoplastic polymers having a high glass transition temperature, e.g., the commonly known thermoplastic bisphenol A-based polycarbonates; highly cross-linked optical polymers; and other such polymer materials. In order to allow the use of such materials for photochromic applications, it has been proposed to apply photochromic coatings, e.g., organic coatings, to their surface.

For some applications it is economically attractive to use photochromic-containing, radiation-curable organic coating compositions. These coating compositions are applied to the surface of the chosen non-photochromic receptive material and cured by, for example, exposure to ultraviolet light. Typically, radiation-curable coating compositions contain a photoinitiator to initiate the curing mechanism. Generally, photoinitiator compounds have an aromatic ring in their structure, which effectively absorbs ultraviolet light. Moreover, they are usually of low molecular weight to improve their solubility in the radiation-curable composition, and consequently are relatively volatile when subjected to heat. These properties can cause yellowing of the cured coating and produce unpleasant odors respectively when the curable and cured coating composition containing the photoinitiator is subjected to heat and light during and after curing. Further, it is known that unreacted photoinitiators remain in the cured coating composition after curing, and can be exuded from the coating.

It is therefore desirable to utilize photochromic-containing coating compositions, e.g., radiation-curable coating compositions, which do not require a photoinitiator for curing, or require a lower amount of photoinitiator than is generally used to cure radiation-curable coating compositions. Moreover, it would be desirable to utilize such coating compositions as photochromic coatings for materials that are not receptive to incorporating photochromic materials within the matrix (core) or subsurface region of the material.

BRIEF SUMMARY OF THE INVENTION

In a non-limiting embodiment of the present invention, there is provided an article comprising (a) a rigid substrate having at least one surface suitable for accommodating a photochromic coating, and (b) a transparent photochromic coating comprising dendritic polymeric acrylate on at least a portion of said surface of the rigid substrate, wherein the coating comprises a photochromic amount of at least one photochromic material.

In another non-limiting embodiment, there is provided an optical article comprising (a) a rigid optical substrate having at least one surface capable of accommodating a photochromic coating, and (b) a transparent photochromic coating comprising dendritic polyester acrylate on at least a portion of said surface of the rigid optical substrate, wherein the coating comprises a photochromic amount of at least one photochromic material, e.g., an organic photochromic material. In one non-limiting embodiment, the optical article is an ophthalmic article, e.g., a lens.

In a further non-limiting embodiment of the present invention, the photochromic ophthalmic article further comprises an abrasion-resistant coating, e.g., a hard coating comprising an organo silane, on the photochromic coating.

DETAILED DESCRIPTION OF THE INVENTION

For purposes of this specification (other than in the operating examples), or unless otherwise indicated, all numbers expressing quantities and ranges of ingredients, reaction conditions, etc that may be used in the following description and claims are to be understood as modified in all instances by the term "about". Accordingly, unless indicated to the contrary, numerical parameters set forth in this specification and attached claims are approximations that may vary depending upon the results to be obtained by a process and for the properties sought for the articles of the present invention. At the very least, and not as an attempt to limit the application of the doctrine of equivalents to the scope of the attached claims, each numerical parameter should at least be construed in light of the number of reported significant digits and by applying ordinary rounding techniques. Further, as used in this specification and the appended claims, the singular forms "a", "an", "said" and "the" are intended to include plural referents, unless expressly and unequivocally limited to one referent.

Notwithstanding that the numerical ranges and parameters setting forth the broad scope of the invention are approximations, numerical values set forth in specific examples are reported as precisely as possible. Any numerical value, however, inherently contains certain errors necessarily resulting from the standard deviation found in their respective testing measurements. Also, it should be understood that any numerical range recited herein is intended to include all sub-ranges subsumed therein. For example, a range "1 to 10" is intended to include all sub-ranges between and including the recited minimum value of 1 and the recited maximum value of 10; namely, a range having a minimum value equal to or greater than 1 and a maximum value of equal to or less than 10. Because the disclosed ranges are continuous, they include every value between the minimum and maximum values. Unless expressly indicated otherwise, the various numerical ranges specified in this application are, as stated, approximations.

As used in the following description and claims, the following terms have the indicated meanings:

The terms "acrylic" and "acrylate" are used interchangeably (unless to do so would alter the intended meaning) and are intended to cover and include acrylic acid, lower alkyl-substituted acrylic acids, e.g., $C_1$-$C_5$ substituted acrylic acids, such as methacrylic acid, ethacrylic acid, etc, and derivatives of such acrylic acids, such as their $C_1$-$C_5$ alkyl esters, e.g., methyl acrylate, methyl methacrylate, etc., unless clearly indicated otherwise. The terms "(meth)acrylic" or "(meth) acrylate", as used for example in connection with the term (meth)acrylate monomer are intended to cover both the acrylic/acrylate and methacrylic/methacrylate forms of the indicated material, e.g., the monomer material.

The term "cure", "cured" or similar terms, as used in connection with a cured or curable composition, e.g., a "cured composition" of some specific description, is intended to mean that at least a portion of the polymerizable and/or crosslinkable components that form the curable composition are at least partially polymerized and/or crosslinked. In a non-limiting embodiment, the degree of crosslinking, can range from 5% to 100% of complete crosslinking. In alternate non-limiting embodiments, the degree of crosslinking can range from 35% to 85%, e.g., 50% to 85%, of full crosslinking. The degree of crosslinking can range between any combination of the previously stated values, inclusive of the recited values.

The terms "on", "appended to", "affixed to", "bonded to", "adhered to" or terms of like import mean that an indicated material, such as a coating, film or layer, is either directly connected to (superimposed on) the object surface, or indirectly connected to the object surface through one or more other coatings, films or layers.

The term "ophthalmic" refers to elements and articles that are associated with the eye and vision, such as but not limited to, lenses for eyewear, e.g., corrective and non-corrective lenses, and magnifying lenses.

The term "rigid"; as used for example in connection with a substrate for a photochromic article, means that the specified item is self-supporting.

The term "optical", "optical coating" or terms of like import means that a specified substrate, article, material or coating exhibits a light transmission value (transmits incident light) of at least 4 percent, and exhibits a haze value of less than 1 percent, e.g., a haze value of less than 0.5 percent, when measured at 550 nanometers by, for example, a Haze Gard Plus Instrument. Optical substrates include, but are not limited to, tinted substrates, photochromic substrates, polarizing substrates, tinted photochromic substrates, and tinted polarizing substrates.

The term "substrate", as used for example in connection with the term rigid substrate, means an article having at least one surface that is capable of accommodating a photochromic coating, e.g., a photochromic polymeric coating; namely, the substrate has a surface to which a photochromic coating may be applied. Non-limiting embodiments of the shape the substrate surface may have include, round, flat, cylindrical, spherical, planar, substantially planar, plano-concave and/or plano convex, curved, including but not limited to convex and/or concave, as exemplified by the various base curves used for ophthalmic lenses.

The term "tinted", as used for example in connection with ophthalmic articles, coatings, films and substrates, means that the indicated material contains a fixed light radiation absorbing agent on or in the indicated material. Non-limiting embodiments of fixed light radiation absorbing agents include, but are not limited to, conventional coloring dyes, infrared and ultraviolet light absorbing material. The tinted material has an absorption spectrum for visible radiation that does not vary significantly in response to actinic radiation.

The term "actinic radiation" includes both visible and ultraviolet radiation.

The term "compatible", as used for example in connection with the photochromic coating being compatible with an abrasion-resistant coating, means that the cured photochromic coating is capable of having an abrasion resistant coating, e.g., an organo silane-containing hard coat, appended directly to its surface, and that the abrasion resistant coating adheres to the surface to which it is applied under ordinary handling/wear conditions, as determined by the conventional cross-hatch tape peel adhesion test, and/or the abrasion-resistant coating does not exhibit crazing after being applied and cured.

The term "dichroic material", "dichroic dye" or terms of like import means a material/dye that absorbs one of two orthogonal plane-polarized components of transmitted radiation more strongly than the other. Non-limiting embodiments of dichroic materials/dyes include indigoids, thioindigoids, merocyanines, indans, azo and poly(azo) dyes, benzoquinones, naphthoquinones, anthraquinones, (poly)anthraquinones, anthrapyrimidinones, iodine and iodates.

The term "transparent", as used for example in connection with a substrate, film, and/or coating, means that the indicated substrate, coating, and/or film has the property of transmitting light without appreciable scattering so that objects lying beyond are seen clearly.

The term "dendrimer" or "dendritic polymer" means a three-dimensional polymer having a polyvalent core that is covalently bonded to at least two ordered dendritic (tree-like) branches which extend through at least two generations. Each tree-like branch (or generation) extends from the core or from a prior generation of branches, and each branch in each generation has the same number of reactive sites from which the branches in the next succeeding generation (if any) extend or which serve as terminal reactive sites in the last generation of branches. The dendrimers can be symmetrical or unsymmetrical. The term "dendrimers" includes dendrons and hyperbranched molecules.

The term "dendron" means a specie of dendrimers having branches emanating from a focal point which is or can be joined to a core, either directly or through a linking moiety.

The term "dendritic polymeric acrylate" means a dendrimer (or dendritic polymer) that has been modified to contain terminal acrylic reactive sites. The number of terminal acrylate groups in the dendritic polymer may vary over a broad range. In alternate non-limiting embodiments, the percent of terminal acrylic groups can range from 5 to 100%, based on the initial number of reactive terminal sites on the dendritic polymer, e.g., from 20 to 90% or 40 to 85%, such as from 45 to 80%.

The term "dendritic polyester acrylate" (or a term of like import) means a composition produced by acrylating a dendritic polyester-type macromolecule or by acrylating a dendritic polyester-type macromolecule containing a viscosity reducing material having a group that is acrylated during the acrylation step, e.g., one or more alcohols having one or more hydroxyl groups.

The term "dendritic polyester acrylate coating" (or a term of like import means the coating produced by curing of a composition comprising dendritic polyester acrylate.

The term "composition comprising dendritic polyester acrylate" (or a term of like import) means a composition comprising dendritic polyester acrylate (or a mixture of two or more different dendritic polyester acrylates) and optionally at least one other radiation or thermally curable material, e.g., a composition of a mixture of dendritic polyester acrylate and radiation and/or thermally curable acrylic material, e.g., (meth)acrylic monomer(s). Further, adjuvant materials commonly included in coating compositions may be included in the composition comprising dendritic polyester acrylate.

Photochromism is a phenomenon involving a reversible change in color of a photochromic organic or inorganic material, e.g., a chromene or silver halide salt respectively, or an article comprising such a material. Upon exposure to a source of activating ultraviolet or other actinic radiation, a photochromic material exhibits a change in color, e.g., it becomes darker. When the activating radiation is removed or discontinued, the photochromic material returns to its original color or colorless state.

The mechanism believed to be responsible for the reversible change in color, e.g., the change in the absorption spectrum of the electromagnetic spectrum of visible light, which is typically described as being from 400-700 nanometers (nm), that is characteristic of different types of organic photochromic compounds has been described. See, for example, John C. Crano, "Chromogenic Materials (Photochromic)", Kirk-Othmer Encyclopedia of Chemical Technology, fourth Edition, 1993, pp. 321-332. The mechanism responsible for the reversible change in color of organic photochromic compounds, such as indolino spiropyrans, indolino spirooxazines and naphthopyrans is believed to involve an electrocyclic mechanism. When exposed to activating ultraviolet radiation, these organic photochromic compounds transform from a colorless closed ring form into a colored open ring form.

In accordance with a non-limiting embodiment of the present invention, there are provided transparent photochromic coatings comprising dendritic polymeric acrylate that may be applied to the surface of a rigid substrate, e.g., a rigid optical substrate. Dendrimers have been described in the polymer art. Such materials can be modified, e.g., by reaction with acrylating agents, to contain terminal reactive acrylic groups, which dendritic polymeric acrylates may be used to prepare the transparent photochromic coatings of the present invention. Non-limiting examples of dendritic polymeric acrylates are acrylate modified dendrimers chosen from epoxide-amine dendrimers, carbosilane-based dendrimers, amido amine dendrimers, polysulfide dendrimers, polysiloxane dendrimers, polyaminosulfide dendrimers, polyether dendrimers, polythioether dendrimers, polyester dendrimers, polyester amide dendrimers, poly(ether ketone) dendrimers, and the like.

In a non-limiting embodiment, the dendrimer is an amido amine polymer, which is often referred to as a polyamidoamine dense star polymer. See, for example, U.S. Pat. No. 4,558,120. Such dendrimers may be represented by the formula recited in column 7, lines 10-15 of the '120 patent. A description of such dendrimers and their preparation can be found in column 2, line 39 through column 9, line 18 of the '120 patent, which description is incorporated herein by reference.

In a further non-limiting embodiment, the dendrimer is an epoxide-amine polymer. Such a dendrimers may be prepared by the repetitive reaction sequence of (a) the reaction of moieties that are suitable for generation of primary amino groups to primary amines; (b) an addition reaction of the branching molecules having one epoxide moiety and having at least one moiety that is suitable for the generation of at least a primary amino group onto the primary amino moieties generated in (a); and (c) a terminating reaction that is characterized by the addition reaction of at least a substituted or unsubstituted acrylate onto the amino functions of the dendrimer. The terminating reaction may be performed by the use of (2,3-epoxypropoxy) (meth)acrylate. Epoxide amine dendrimers are described in U.S. Pat. No. 5,760,142. The description found in column 1, line 65 through column 3, line 56 of the '142 patent is incorporated herein by reference.

In accordance with another non-limiting embodiment, the dendrimer is a carbosilane-based polymer. Such a dendrimer comprises a carbosilane core having a central silane nucleus and (a) multiple carbosilane branches extending outwardly from the central nucleus, each peripheral branch having a peripheral silane terminus, and (b) arms of addition polymer chains emanating out from core peripheral silane termini. In one non-limiting embodiment, the number of addition polymer arms is at least 48. Carbosilane dendrimers are described in U.S. Pat. No. 5,276,110, particularly in column 1, line 58 through column 5, line 5, which description is incorporated herein by reference.

In another non-limiting embodiment, the dendrimer is prepared by the polycondensation of cyclic anhydrides with diisopropanol amine. These dendrimers are commercially available under the designation HYBRANE™ from DSM N.V., and have been prepared with acrylate and methacrylate ester end groups. An example of a HYBRANE dendrimer is the commercially available H1500 (unmodified) material.

In a still further non-limiting embodiment, the dendrimer is a polysiloxane polymer, which may be prepared by an iterative silane hydroxylation and chloride displacement at silicon. The specific preparation of these dendrimers is described by Uchida et al, *J. Am. Chem. Soc.*, 1990, 112, 7077-7079, which description is incorporated in its entirety. See also, column 5, line 60 through column 6, line 13 of U.S. Pat. No. 6,889,735 B2, which disclosure is incorporated by reference.

In accordance with a non-limiting embodiment of the present invention, compositions comprising dendritic polymeric acrylate are used to prepare transparent photochromic coatings for rigid substrates. Such photochromic coatings and the method by which compositions comprising the coatings are prepared and applied to a rigid substrate are described with particularity in connection with the following description respecting photochromic coatings prepared with dendritic polyester acrylates. However, one skilled in the art can readily substitute any of the above-described dendrimers (or subsequently developed dendrimers) for the polyester dendrimers, the acrylate of which is used to prepare such photochromic coatings.

Non-acrylated dendritic polyester-type macromolecules are described in U.S. Pat. Nos. 5,418,301, 5,663,247, 6,225,404 B1, and U.S. patent publication 2002/0151652 A1, among others. These macromolecules are typically three-dimensional molecules having a treelike structure. As used herein, the terms "dendritic polyester-type macromolecules" and "dendritic polyester-type oligomers" (or terms of like import) are intended to mean and include hyperbranched dendritic macromolecules and dendrimers. Dendrimers can be said to be monodisperse or substantially monodisperse hyperbranched dendritic macromolecules.

Hyperbranched dendritic polyester macromolecules normally comprise an initiator or nucleus having one or more reactive sites or functions and a number of branching layers and optionally one or more spacing layers and/or a layer of chain terminating molecules. Continued replication of branching layers normally yields increased branch multiplicity and, where applicable or desired, increased number of terminal functions. The layers are usually called generations and the branches dendrons. Hyperbranched dendritic macromolecules (dendrimers) can be illustrated by the formulae found in column 6, lines 8 to 30 of U.S. Pat. No. 6,225,404 B1, which disclosure is incorporated herein by reference. In those formulae, X and Y are initiators or nuclei having four and two reactive functions, respectively, and A, B and C are branching chain extenders having three (A and C) and four (B) reactive functions, each branching chain extender forming one branching generation in the macromolecule. T in the aforementioned formulae is a terminating chain stopper or a suitable terminal function or site, such as hydroxyl, carboxyl or epoxide groups.

A dendron may be pre-produced and then added to a nucleus. A dendron may be produced by for instance condensing one or more hydroxy functional carboxylic acids at normal esterification temperatures, by allowing mono, di, tri or polyfunctional carboxylic acids to form ester links with mono, di, tri or polyfunctional alcohols or epoxides, or by similar procedures resulting in ester links, ether links or other chemical bonds. The raw materials used to produce a dendron are chosen to provide at least one terminal reactive site to be reacted with a nucleus or initiator.

Dendritic polyester-type macromolecules are typically built up from ester or polyester units optionally in combination with ether or polyether units. The hyperbranched dendritic macromolecule comprises a monomeric or polymeric nucleus having at least one reactive epoxide, hydroxyl, carboxyl or anhydride group, to which nucleus are added 1 to 100, generally 1 to 20, e.g., 2 to 8, branching generations comprising at least one monomeric or polymeric branching chain extender having at least three reactive groups, of which at least one is a hydroxyl group and at least one is a carboxyl or anhydride group, and optionally at least one spacing generation comprising at least one chain extender. The spacing chain extender can be a compound having two reactive groups, one being the hydroxyl group and one being a carboxyl or anhydride group, or is an inner ether, such as a lactone, of such a compound. The terminal chain extender functions of the hyperbranched dendritic macromolecule are substantially hydroxyl, carboxyl or anhydride groups and the hyperbranched dendritic macromolecule is optionally completely or partly chain terminated by at least one monomeric or polymeric chain stopper and/or is functionalized.

Dendritic polyester-type macromolecules are well defined, highly branched macromolecules that radiate from a central core and, as discussed, are synthesized through a stepwise repetitive branching reaction sequence. The repetitive branching sequence typically guarantees complete shells for each generation, leading to macromolecules that are typically monodisperse. The synthetic procedures for dendritic polyester macromolecule preparation often provide nearly complete control over the size, shape, surface/interior chemistry, flexibility and topology. The dendritic polyester macromolecule can have complete and symmetrical branches as well as incomplete and asymmetric branches.

Non-limiting examples of central initiator molecules for polyester-type dendritic macromolecules include aliphatic, cycloaliphatic or aromatic diols, triols, tetraols, sorbitol, mannitol, dipentaerythritol, a reaction product of a di-, tri- or polyalcohol and an alkylene oxide, e.g., ethylene oxide, propylene oxide and butylene oxide, having a molecular weight less than 2000. Non-limiting examples of diols include 1,3-propanediol, a dimer, trimer or polymer of 1,3-propanediol, a 2-alkyl-1,3-propanediol, a 2,2-dialkyl-1,3-propanediol, such as 2-butyl-2-ethyl-1,3-propanediol, a 2-hydroxy-2-alkyl-1,3-propanediol, a 2,2-di(hydroxyalkyl)-1,3-propanediol, a 2-hydroxyalkoxy-2-alkyl-1,3-propanediol, a 2,2-di(hydroxyalkoxy)-1,3-propanediol, 1,2-propanediol, 1,3-butanediol, 1,2-ethanediol, 1,4-butanediol, 1,5-pentanediol, neopentyl glycol, trimethylolethane, trimethylolpropane, pentaerythritol, ditrimethylolethane, ditrimethylolpropane, 1,6-hexanediol and polytetrahydrofuran. The alkyl groups of the initiator molecules are generally $C_1$ to $C_{12}$, e.g., $C_1$ to $C_4$, alkyl groups.

Polyester chain extenders are monofunctional carboxylic acids having at least two hydroxyl groups such as, but not limited to, dimethylolpropionic acid, $\alpha,\alpha$-bis(hydroxy) propionic acid, $\alpha,\alpha$-bis(hydroxymethyl) propionic acid, $\alpha,\alpha$-bis(hydroxymethyl) butyric acid, $\alpha,\alpha$-bis(hydroxymethyl) valeric acid, $\alpha,\alpha,\alpha$-tris(hydroxymethyl) acetic acid, $\alpha,\alpha$-bis(hydroxymethyl) butyric acid, $\alpha,\beta$-dihydroxy propionic acid, heptonic acid, citric acid, d- or l-tartaric acid or $\alpha$-phenylcarboxylic acids, such as 3,5-dihydroxybenzoic acid.

Chain terminating agents that can be used include, but are not limited to, saturated monofunctional carboxylic acids, saturated fatty acids, unsaturated monofunctional carboxylic acids, aromatic monofunctional carboxylic acids, such as benzoic acid, and difunctional or polyfunctional carboxylic acids or anhydrides thereof. A non-limiting example of such an acid is behenic acid. Terminal hydroxyl groups in the polyester chain extender can be reacted with chain stoppers with or without functional groups.

Dendritic polyester-type macromolecules are commercially available from Perstorp Specialty Chemicals, Perstorp, Sweden under the designation BOLTORN® H20, H30, and H40 dendritic macromolecules, which macromolecules are functionalized with hydroxy groups at the periphery. These materials generally have a weight average molecular weight in the range of 1,000 to 4000. The BOLTORN® H20, H30 and H40 materials have on average 16, 32 and 64 hydroxy groups respectively at the periphery of the macromolecule.

Dendritic polyester macromolecule materials may be acrylated by known esterification techniques to provide material used to form the dendritic polyester acrylate resin of optical quality used to prepare the photochromic coatings described in this specification. See, for example, the disclosures in International Patent Publications WO 00/77070 A2 and WO 00/64975.

Acrylation of the dendritic polyester macromolecule, and recovery and purification of the acrylated dendritic polyester macromolecule may be performed using methods well known from the literature, as for instance the methods described in the article "Acrylic Ester Polymers", which is found in the Kirk-Othmer Encyclopedia of Chemical Technology (1980 Vol. 1, pages 386-413). Acrylation is generally a direct reaction, such as esterification, of the molecule to be acrylated with for example acrylic acid, methacrylic acid, or crotonic acid (β-methacrylic acid), condensation with an isocyanato (meth)acrylate, or a direct reaction with an anhydride and/or a halide corresponding to said acrylic acid, usually at a molar ratio of hydroxyl groups to said acid, anhydride and/or halide of generally between 1:0.1 and 1:5, more usually between 1:0.5 and 1:1.5. Other non-limiting examples of acrylating agents include epoxide or anhydride functional acrylates and methacrylates, such as glycidylmethacrylate. In a non-limiting embodiment, the acrylating agent is used in a stoichiometrica molar excess.

The percent of functional acrylic acid groups, e.g., hydroxyl groups that have been acrylated, in acrylated dendritic polyester macromolecules may vary, but generally will range from 5 to 100%, based on the initial hydroxyl content. In alternate non-limiting embodiments, the percent of functional acrylic acid groups in the acrylated dendritic polyester macromolecule may vary from 20 to 90%, e.g., 40 to 85%, such as from 45 to 80%. The percentage of acrylated hydroxyl groups may range between any combination of these percentages, inclusive of the recited percentages.

The esterification step is typically performed in the presence of a solvent, such as an apolar organic solvent. Non-limiting examples of such solvents include, but are not limited to, heptane, cyclohexane, toluene, benzene, xylene or mixtures of such solvents. The esterification is conveniently performed in the presence of a catalyst, such as, but not limited to, p-toluene sulfonic acid, methane sulfonic acid, trifluoromethane sulfonic acid, trifluoroacetic acid, sulfuric acid, phosphoric acid, naphthalene sulfonic acid, Lewis acids such as $BF_3$, $AlCl_3$, $SnCl_4$, titanates such as tetrabutyl titanates, and organotin compounds. The acrylation step is generally performed at temperatures of from 50 to 200° C., e.g., from 80 to 150° C. Acrylation temperatures may vary and will generally depend upon the selected solvent and the pressure at which the acrylation step is performed. The acrylation step may be performed in the presence of a radical polymerization inhibitor, such as but not limited to, methyl ether hydroquinone, hydroquinone, phenothiazine, di-t-butyl hydroquinone, or a mixture of such inhibitors.

In accordance with the disclosure of International Patent Publication WO 00/64975, a dendritic polymeric macromolecule, e.g., a dendritic polyester macromolecule, may be mixed with an organic alcohol, e.g., an aliphatic alcohol, having one or more hydroxyl groups and a molecular weight of less than 2000, e.g., a molecular weight of from 60 to 1500, or 100 to 1000, prior to the acrylation step because dendritic polymeric macromolecules are generally viscous liquids. Generally, the alcohol is a liquid at temperatures of from 20 to 50° C. or yields liquid mixtures with the dendritic polymeric macromolecule at said temperature. The alcohol may be a diol. Non-limiting examples of diols include ethylene glycol, a 1,2- or 1,3-propylene glycol, a butanediol or a di-, tri- or polyglycol, as for example a diethylene glycol, a polypropylene glycol or a glycol polymer, such as a polymer comprising one or more ethylene glycols and one or more propylene glycols. The weight ratio of the dendritic polymeric macromolecule and alcohol may vary. In general, the weight ratio of dendritic polymeric macromolecule to alcohol may vary between 90:10 and 10:90. In alternate non-limiting embodiments, the weight ratio of the dendritic polymeric macromolecule to alcohol may vary between 25:75 and 75:25 or between 40:60 and 60:40, e.g., 50:50. The weight ratio of the dendritic polymeric macromolecule and alcohol may vary between any combination of the recited values, inclusive of the specified values. Acrylation of the mixture produces an acrylate composition comprising at least one dendritic polymeric acrylate and at least one acrylate monomer.

In a non-limiting embodiment, radiation curable acrylic monomer material(s) may be included in the composition comprising dendritic polyester acrylate. Non-limiting examples of radiation curable acrylic monomer materials include monoacrylates, and polyacrylates, such as diacrylates, triacrylates, tetraacrylates, pentaacrylates, etc. Monoacrylates, e.g., a monomer containing a single acrylic functionality, include but are not limited to hydroxy-substituted monoacrylates and alkoxysilyl alkyl acrylates, such as trialkoxysilylpropylmethacrylate. In one non-limiting embodiment, the radiation curable monomer materials are chosen from diacrylates, triacrylates and mixtures of such polyacrylates.

The weight ratio of radiation curable acrylic monomer material(s) to dendritic polymeric acrylate in the composition comprising dendritic polymeric acrylate may vary and will depend generally on the physical properties of the curable mixture and the resultant coating that are desired, e.g., viscosity of the mixture, the degree of crosslinking, and hardness of the coating. In a non-limiting embodiment, the weight ratio of dendritic polymeric acrylate(s) to the radiation curable acrylic monomer material(s) may range from 90:10 to 10:90. In alternate non-limiting embodiments, the weight ratio may range from 70:30 to 30:70, e.g., from 40:60 to 60:40, such as 50:50. The weight ratio of dendritic polymeric acrylate to the radiation curable acrylic monomer material may vary between any combination of the recited values, inclusive of the specified values.

Generally, the ratio of dendritic polymeric acrylate(s) to radiation curable acrylic monomer material(s) chosen will be that which provides the desired balance between the physical properties of the coating and the photochromic performance of the coating. A softer coating will generally enhance photochromic kinetic performance, e.g., activation (degree of activation and time to activate) and deactivation of the photochromic (time to fade). The hardness (softness) of a coating can be measured by techniques well known in the relevant art, e.g., Fischer microhardness, pencil hardness or Knoop hardness. Fischer microhardness values can be obtained using a Fischerscope HCV Model-H-100 instrument (available from Fischer Technology, Inc.) by taking 3 measurements in the center area of the test sample under conditions of a 100 milliNewton load, 30 load steps, and 0.5 second pauses between load steps at an indentor (Vickers diamond stylus) depth of 2 μm (microns).

Acrylic monomer materials may be represented by the following general formula I, $$R''-[OC(O)C(R')=CH_2]_n \qquad \text{I}$$

wherein R" is an aliphatic or aromatic group containing from 2 to 20 carbon atoms and optionally from 1 to 20 alkyleneoxy linkages; R' is hydrogen or an alkyl group containing from 1 to 4 carbon atoms, and n is an integer of 1 to 5. When n is greater than 1, R" is a linking group that links the acrylic functional groups together. Generally, R' is hydrogen or methyl, and n is an integer of from 1 to 3. Diacrylates (when n is 2) may be represented by general formula II,

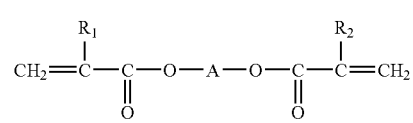

wherein $R_1$ and $R_2$ may be the same or different and are each selected from hydrogen or alkyl groups containing from 1 to 4 carbon atoms, e.g., methyl, and A is a hydrocarbyl linking group of, for example, from 1 to 20 carbon atoms, e.g., an alkylene group, one or more oxyalkylene group(s) [or mixture of different oxyalkylene groups]; or a group of the following general formula III,

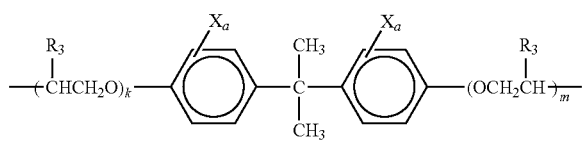

wherein each $R_3$ is hydrogen, hydroxy or an alkyl group of from 1 to 4 carbon atoms, e.g., methyl; X is a halogen atom, e.g., chlorine; a is an integer of from 0 to 4, e.g., 0 to 1, representing the number of halogen atoms substituted on the benzene ring; and k and m are numbers of from 0 to 20, e.g., 1 to 15, or 2 to 10. The values of k and m are average numbers and when calculated may be a whole number or a fractional number.

Acrylates having an epoxy group may be represented by the following general formula IV,

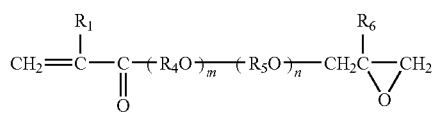

wherein $R_1$ and $R_6$ may be the same or different and are each chosen from hydrogen or an alkyl group of from 1 to 4 carbon atoms, e.g., methyl; $R_4$ and $R_5$ are alkylene groups containing from 2 to 3 carbon atoms, e.g., ethyleneoxy and propyleneoxy, and m and n are numbers of from 0 to 20, e.g., 0 or 1 to 15, or 2 to 10. When one of m and n is 0 and the other is 1, the remaining R group may be an aromatic group of the following general formula V,

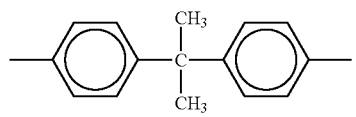

e.g., a group derived from the 2,2'-diphenylenepropane radical, which phenyl groups may be substituted with $C_1$ to $C_4$ alkyl groups or halogens, e.g., methyl and/or chlorine.

In the following named non-limiting examples of acrylic monomer materials, the term "acrylate", as earlier defined, includes the corresponding lower alkyl-substituted acrylates, such as the corresponding methacrylate; and vice-versa. For example, the reference to hydroxyethyl acrylate includes hydroxyethyl methacrylate, hydroxyethyl ethacrylate, etc.; and reference to ethylene glycol diacrylate includes, for example, ethylene glycol dimethacrylate, ethylene glycol diethacrylate, etc. Non-limiting examples of acrylic monomer materials include:

Hydroxyethyl acrylate,
Hydroxypropyl acrylate,
Hydroxybutyl acrylate,
Hydroxy-poly(alkyleneoxy)alkyl acrylate,
Caprolactone acrylate,
Ethylene glycol diacrylate,
Butanediol diacrylate,
Hexanediol diacrylate,
Hexamethylene diacrylate,
Diethylene glycol diacrylate,
Triethylene glycol diacrylate,
Tetraethylene glycol diacrylate,
Polyethylene glycol diacrylate,
Dipropylene glycol diacrylate,
Tripropylene glycol diacrylate,
Tetrapropylene glycol diacrylate,
Polypropylene glycol diacrylate,
Glyceryl ethoxylate diacrylate,
Glyceryl propoxylate diacrylate,
Trimethylolpropane triacrylate
Trimethylolpropane ethoxylate triacrylate,
Trimethylolpropane propoxylate triacrylate,
Neopentyl glycol diacrylate,
Neopentyl glycol ethoxylate diacrylate,
Neopentyl glycol propoxylate diacrylate,
Monomethoxy trimethylolpropane ethoxylate diacrylate,
Pentaerythritol ethoxylate tetraacrylate,
Pentaerythritol propoxylate tetraacrylate,
Dipentaerythritol pentaacrylate,
Dipentaerythritol ethoxylate pentaacrylate,
Dipentaerythritol propoxylate pentaacrylate,
Di-trimethylolpropane ethoxylate tetraacrylate,
Bisphenol A ethoxylate diacrylate containing from 2 to 30 ethoxy groups,
Bisphenol A propoxylate diacrylate containing from 2 to 30 propoxy groups,
Bisphenol A alkoxylated diacrylate containing a mixture of from 2 to 30 ethoxy and propoxy groups,
Bisphenol A glycerolate dimethacrylate,
Bisphenol A glycerolate (1 glycerol/1 phenol) dimethacrylate,
Glycidyl acrylate,
β-methylglycidyl acrylate,
Bisphenol A-monoglycidyl ether acrylate,
4-glycidyloxybutyl methacrylate,
3-(glycidyl-2-oxyethoxy)-2-hydroxypropyl methacrylate,
3-(glycidyloxy-1-isopropyloxy)-2-hydroxypropyl acrylate,
3-(glycidyloxy-2-hydroxypropyloxy)-2-hydroxypropyl acrylate, and
3-(Trimethoxysilyl)propyl methacrylate.

Many radiation curable acrylic materials are commercially available; and, if not commercially available, may be prepared by procedures well known to those skilled in the art. Non-limiting examples of commercial acrylate materials can be found in U.S. Patent 5,910,375, particularly in the disclosure found in column 8, lines 20-55, and in column 10, lines 5-36, which disclosures are incorporated herein by reference. Commercially available acrylate materials are available from various manufacturers and include those sold under the trade names, SARTOMER, EBECRYL, and PHOTOMER.

In a further non-limiting embodiment, reactive difunctional acrylic monomer materials represented by the following general formula VI may be included in the composition comprising dendritic polymeric acrylate:

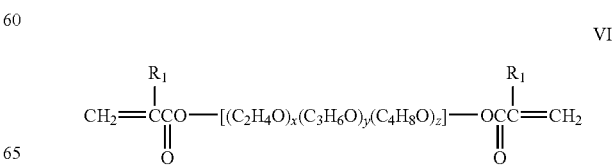

wherein each $R_1$ is hydrogen or methyl, x, y and z are each a positive number, the sum of x, y and z being from 9 to 30. A more detailed description of monomers represented by general formula VI can be found in column 5, lines 1-25, and column 6, lines 28 to 37 of U.S. Pat. No. 6,602,603, which disclosures are incorporated herein by reference.

In yet another non-limiting embodiment of the present invention, the composition comprising dendritic polymeric acrylate may include the reaction product of (1) at least one material containing at least one carbonate group and at least one hydroxyl group, such as an alcohol or polyol containing a carbonate group, or an acrylic monomer containing at least one carbonate group and at least one hydroxyl group, e.g., a polycarbonate polyol; and (2) a material containing at least one monoisocyanate group and at least one unsaturated group, such as the reaction product of an acrylic monomer containing a vinyl ether group and isocyanic acid. A detailed description of such reaction products can be found in the disclosure of International Patent Publication WO 03/037998 A1 at page 8, line 32 through page 15, line 16, and at page 15, line 37 through page 22, line 19, which disclosures are incorporated herein by reference.

In a still further non-limiting embodiment, reactive monomers/diluents, such as monomers containing a radiation or thermally curable ethylenic or allylic functional group (other than the acrylic functional group) may also be present in the composition comprising the dendritic polymeric acrylate. A non-limiting example of such a material includes, but is not limited to, radiation curable vinyl compounds, e.g., vinyl ethers. Generally, reactive monomers/diluents may be present in the composition in amounts of up to 20 weight percent, e.g., from 0 to 10 weight percent, (based on resin solids). The amount of reactive monomers/diluents may vary between any of the specified amounts including the recited values. The particular amount used will depend on the ultimate physical properties desired for the curable composition and the resultant coating, as described with respect to the radiation curable acrylic monomer materials.

Compounds having vinyl ether groups that may be used in the radiation-curable composition comprising dendritic polymeric acrylate include, but are not limited to, alkyl vinyl ethers having a terminal group substituted with hydrogen, halogen, hydroxyl and amino atoms/groups; a cycloalkyl vinyl ether having a terminal group substituted with hydrogen, halogen, hydroxyl and amino atoms/groups; monovinyl ethers, divinyl ethers and polyvinyl ethers in which a vinyl ether group is connected with an alkylene group; and in which a vinyl ether group is connected with at least one group with and without substituents selected from alkyl, cycloalkyl and aromatic groups, via at least one linkage selected from an ether linkage, a urethane linkage and an ester linkage. See, for example, the vinyl ethers specified in column 19, line 26 through column 20, line 27 of U.S. Pat. No. 6,410,611 B1, which disclosure is incorporated herein by reference.

The aforedescribed amounts of acrylic monomers, reactive monomers/diluents, etc are based on the total quantity of polymerizable materials (resin solids) in the composition comprising dendritic polymeric acrylate, not including other non-polymerizable components, such as non-polymerizable organic diluents, e.g., solvents, photoinitiators, stabilizers, plasticizers and other such components. The total of all of the various components comprising the photochromic coating composition will, of course, equal 100 percent.

The composition comprising dendritic polymeric acrylate may contain additives (adjuvants) to enhance the efficacy of the resultant photochromic coating. Such additives include, but are not limited to, adhesion promoting additives, ultraviolet light stabilizers, hindered amine stabilizers, mold release agents, viscosity, flow and leveling additives, wetting agents, antifoaming agents, rheology modifiers, surfactants, e.g., fluorosurfactants, antioxidants, etc. Such materials are well known to those skilled in the art. Non-limiting examples of commercial surfactants, antioxidants and stabilizers can be found in column 10, lines 43-54 of U.S. Pat. No. 5,910,375, which disclosure is incorporated by reference. Other non-limiting examples of such additives include silicones, modified silicones, silicone acrylates, hydrocarbons, and fluorine-containing compounds.

In accordance with a non-limiting embodiment, it is contemplated that an adhesion-enhancing amount of at least one adhesion promoting material (adhesion promoter) may be incorporated into the curable composition comprising the dendritic polymeric acrylate. By adhesion-enhancing amount is meant that the compatibility of the photochromic-containing dendritic polymeric acrylate coating to a superimposed organo silane-containing abrasion-resistant coating (as described herein) applied to the dendritic polymeric acrylate coating is enhanced. Generally, from 0.1 to 20 weight percent (based on resin solids) of at least one adhesion promoter(s) may be incorporated into composition comprising dendritic polymeric acrylate prior to applying the composition on the substrate. In alternate non-limiting embodiments, from 0.5 to 16, e.g., 0.5 to 10, weight percent, or 0.5 to 8, e.g., 5, weight percent, of at least one adhesion promoter may be incorporated into the dendritic polymeric acrylate composition. The amount of adhesion promoter incorporated into the dendritic polyester acrylate composition may range between any combination of the aforesaid values, inclusive of the recited values.

Among the adhesion promoter materials that may be incorporated into the dendritic polymeric acrylate coating to enhance its compatibility with an abrasion-resistant coating, e.g., an abrasion-resistant coating comprising organo-silane material, include, but are not limited to, adhesion promoting organo-silane materials, such as aminoorganosilanes, and silane coupling agents, organic titanate coupling agents and organic zirconate coupling agents.

The photochromic coating composition comprising the dendritic polymeric acrylate may also contain ultraviolet light stabilizers, which may be a UV absorber and/or a hindered amine light stabilizer (HALS). Non-limiting examples of UV absorbers include benzotriazoles and hydroxybenzophenones. Care should be observed when using UV absorbers that sufficient UV radiation of the appropriate wavelength is permitted to pass through the coating to activate the photochromic material(s) within the photochromic coating. HALS stabilizers are available from Ciba-Geigy under the TINUVIN trade name. The amount of light stabilizer that is used is that amount that is effective to stabilize the composition, e.g., an effective amount, which will depend on the specific compounds chosen. In a non-limiting embodiment, the amount of light stabilizer used is generally up to 20 parts by weight relative to 100 parts by weight of the monomer/polymer components of the dendritic polymeric acrylate composition. The UV absorber is also used in effective amounts, which in a non-limiting embodiment is generally up to 10 parts by weight, e.g., 0.05 to 5 parts by weight, relative to 100 parts of the dendritic polymeric acrylate composition.

Solvents may also be present in the coating composition in order to dissolve and/or disperse the components comprising the coating composition comprising dendritic polymeric acrylate. Generally, a solvating amount of solvent is used, e.g., an amount which is sufficient to solubilize/disperse the solid components in the coating composition. In one non-limiting embodiment, from 10 to 80 weight percent of solvent material, based on the total weight of the coating composition, is used.

Non-limiting examples of solvents include benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl)pyrrolidinone, N-(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and di-alkyl ethers of ethylene glycol and their derivatives, which are sold as CELLOSOLVE industrial solvents, and mixtures of such solvents.

Dendritic polymeric acrylates, e.g., dendritic polyester acrylates, and compositions comprising such acrylate(s) may be cured with or without the use of photoinitiators. While these materials may be cured without photoinitiators, the use of small amounts of one or more photoinitiators will enhance the cure rate and provide a more complete cure in a shorter amount of time. A photoinitiator is, of course, not required when the dendritic polymeric acrylate resin formulation is cured by electron beam radiation.

When used, photoinitiators are present in amounts sufficient to initiate and sustain the curing of the composition, e.g., an initiating or photoinitiating amount. Photoinitiators are desirably used in the least amount necessary to obtain initiation of the curing process. In alternate non-limiting embodiments, the photoinitiator(s) is present in amounts of from 0.1 to 10 weight percent, such as from 0.5 to 6 weight percent, more generally from 0.5 to 1 weight percent, based on the total weight of the radiation curable polymerizable components in the curable composition comprising dendritic polymeric acrylate.

Photoinitiators are well known to those skilled in the art. Photoinitiators that are free radical initiators are classified in two major groups based upon their mode of action. Cleavage-type photoinitiators include, but are not limited to, acetophenones, α-aminoalkylphenones, benzoin ethers, benzoyl oximes, acylphosphine oxides and bisacylphosphine oxides. Abstraction-type photoinitiators include, but are not limited to, benzophenone, Michler's ketone, thioxanthone, anthraquinone, camphorquinone, fluorone and ketocoumarin. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation can still occur via hydrogen abstraction from monomers, oligomers or other components of the system.

Non-limiting examples of photopolymerization initiators that may be used include benzil, benzoin, benzoin methyl ether, benzoin isobutyl ether, benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, such as 2,6-dimethylbenzoyl diphenyl phosphine oxide, 2,4,6-trimethylbenzoyl diphenyl phosphine oxide, 2,6-dichlorobenzoyl diphenyl phosphine oxide, and 2,6-dimethoxybenzoyl diphenyl phosphine oxide; bisacylphosphine oxides, such as bis(2,6-dimethyoxybenzoyl)-2,4,4-trimethylpentyl phosphine oxide, bis(2,6-dimethylbenzoyl)-2,4,4-trimethylpentyl phosphine oxide, bis (2,4,6-trimethylbenzoyl)-2,4,4-trimethylpentyl phosphine oxide, and bis(2,6-dichlorobenzoyl)-2,4,4-trimethylpentyl phosphine oxide; phenyl-4-octyloxyphenyliodonium hexafluoroantimonate, dodecyldiphenyliodonium hexafluoroantimonate, (4-(2-tetradecanol)oxyphenyl)-iodonium hexafluoroantimonate and mixtures of such photo polymerization initiators. Examples of commercially available photoinitiators can be found in column 10, lines 38-43 of U.S. Pat. No. 5,910,375, and in column 11, lines 24-65 of U.S. Pat. No. 6,271,339 B1, which disclosures are incorporated herein by reference.

In addition to photoinitiators, the curable composition comprising dendritic polyester acrylate may also include thermal initiators, e.g., peroxy or azo-type initiators, or catalysts to assist in the cure of other reactive monomers present in the coating composition. The choice (and amount) of such additional initiators/catalysts will depend on the initiation requirements of the reactive monomer/diluents used, which initiation requirements are well known to those skilled in the art.

The curable photochromic coating composition comprising dendritic polymeric acrylate is prepared by mixing the components of the composition at temperatures that facilitate mixing and blending. The composition can then be applied to the rigid substrate by well known and art recognized techniques, e.g., spin coating, dip coating, curtain coating, spray coating or by methods used in preparing overlays. Such methods are described in U.S. Pat. No. 4,873,029.

Prior to applying the photochromic coating to the surface of the substrate, the surface is often cleaned and treated to provide a clean surface and a surface that will enhance adhesion of the photochromic coating to the substrate. Effective cleaning and treatments commonly used include, but are not limited to, ultrasonic washing with an aqueous soap/detergent solution, cleaning with an aqueous mixture of organic solvent, e.g., a 50:50 mixture of isopropanol:water or ethanol:water, UV treatment, activated gas treatment, e.g., treatment with low temperature plasma or corona discharge, and chemical treatment that results in hydroxylation of the substrate surface, e.g., etching of the surface with an aqueous solution of alkali metal hydroxide, e.g., sodium or potassium hydroxide, which solution may also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials. Such disclosures are incorporated herein by reference.

In a non-limiting embodiment, surface treatment of the substrate can be a low temperature plasma treatment. This method allows treatment of the surface to enhance adhesion of a superimposed film or coating, and is a clean and efficient way to alter the physical surface, e.g., by roughening and/or chemically altering the surface without affecting the rest of the article. Inert gases, such as argon, and reactive gases, such as oxygen, have been used as the plasma gas. Inert gases will roughen the surface, while reactive gases such as oxygen will both roughen and chemically alter slightly the surface exposed to the plasma, e.g., by producing hydroxyl or carboxyl units on the surface. The extent of the surface roughening and/or chemical modification will be a function of the plasma gas and the operating conditions of the plasma unit (including the length of time of the treatment).

In a non-limiting embodiment, a primer coating can be applied to the surface of the substrate before application of the photochromic coating. The primer coating can be interposed between the substrate and the photochromic coating, and serves as a barrier coating to prevent interaction of the components comprising the photochromic coating with the substrate and vice versa, and/or as an adhesive layer to promote adhesion of the coating to the substrate. The primer can be applied to the substrate by any of the conventional methods known to those skilled in the art of applying coatings, e.g., spray, spin, spread, curtain, roll or dip coating; and can be applied to a cleaned and untreated or cleaned and treated, e.g., chemically treated, surface of the substrate. Primer coatings are well known to those skilled in the art. Selection of an appropriate primer coating will depend on the substrate used and the particular photochromic coating.

The primer coating can be one or several monomolecular layers thick. In a non-limiting embodiment, the primer coating can range from 0.1 to 10 microns. In alternate non-limiting embodiments, the primer coating can range from 0.1 to 2 or 3 microns in thickness. The thickness of the primer may vary between any combination of the aforementioned values, inclusive of the recited values. In alternate non-limiting embodiments, the primer coating is a composition comprising an organofunctional silane, as described in U.S. Pat. No. 6,150,430, or a composition that is substantially free of organosiloxanes, as described in U.S. Pat. No. 6,025,026.

The photochromic coating composition comprising dendritic polymeric acrylate, e.g., dendritic polyester acrylate, may be cured by exposing it to UV radiation (or to an Electron Beam process, if UV radiation is not used), e.g., radiation in the range of 200 and 450 nanometers. In one non-limiting embodiment, UV exposure may be accomplished by passing the coating, e.g., the substrate on which the coating is applied, under a commercially available UV or excimer lamp on a conveyer moving at predetermined speeds. The radiation may contain in its spectra both visible and ultraviolet light. The radiation may be monochromatic or polychromatic, incoherent or coherent and should be sufficiently intense to initiate the polymerization of the polymerizable components of the photochromic composition comprising dendritic polymeric acrylate. The cure process is generally more efficient when oxygen, e.g., air, is excluded from the cure process. This can be accomplished by using a nitrogen blanket over the applied film during the cure process.

The source of curing radiation used for photopolymerization is selected from those sources that emit ultraviolet light and/or visible light. The source of radiation may be a mercury lamp, a mercury lamp doped with $FeI_3$ and/or $GaI_3$, a germicidal lamp, a xenon lamp, a tungsten lamp, a metal halide lamp or a combination of such lamps. Typically, the absorbance spectra of the photoinitiator(s) is matched with the spectral output of the light source bulb, e.g., an H bulb, D bulb, Q bulb and/or V bulb, for highest curing efficiency. The exposure time of the curable coating to the light source will vary depending upon the wavelength and intensity of the light source, the photoinitiator, and thickness of the coating. Generally, the exposure time will be sufficient to substantially cure the coating, or produce a coating that is cured sufficiently to allow physical handling followed by a post thermal cure. The time required for ultraviolet or electron beam radiation cures is generally shorter than a thermal cure, e.g., from 5 seconds to 5 minutes, and will depend on the intensity (power) of the radiation.

The specific cure conditions used may vary. Generally, the cure conditions will depend on the specific substrate chosen, the polymerizable components in the photochromic coating formulation and the type of catalyst/initiator used, or in the case of electron beam radiation, the intensity of the electron beam. One skilled in the art of photopolymerization can readily determine the appropriate cure conditions to be used.

The photochromic coating composition comprising the dendritic polyester acrylate may also be cured thermally, although thermal curing is less desirable. For example, a thermal azo-type or peroxy-type free radical initiator may be incorporated into the coating composition and the coating cured by infrared heating or by placing the coating, e.g., the substrate containing the coating, in a conventional oven, e.g., a convection oven, maintained at temperatures sufficient to cure the coating. Desirably, thermal initiators are those that do not discolor the resulting coating or decompose the photochromic material incorporated within the polymerizable coating composition. Thermal curing may involve heating the photochromic coating from room temperature up to temperatures below which the substrate and photochromic material are not damaged due to such heating. For example, a typical thermal cure cycle may involve heating the coating formulation from room temperature (22° C.) to from 85 to 125° C. over a period of from 2 to 20 minutes.

Non-limiting examples of suitable organic peroxy compounds include peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide.

Non-limiting examples of suitable azobis(organonitrile) compounds include azobis(isobutyronitrile), 2,2'-azobis(2,4-dimethylpentanenitrile), 1,1'-azobiscyclohexanecarbonitrile, and azobis(2,4-dimethylvaleronitrile) and mixtures of such azo thermal initiators.

When the thermal or UV/electron beam cure conditions produce a coating that can be physically handled but is not completely cured, a thermal post cure step may be used to fully cure the photochromic coating. Heating in an oven at 212° F. (100° C.) for from 0.5 to 3 hours is usually adequate for the thermal post cure step to thoroughly cure the coating. In a further contemplated embodiment, the photochromic dendritic polymeric acrylate coating may be cured with a combination of a thermal initiator and a photoinitiator.

Rigid substrates to which the photochromic dendritic polymeric acrylate coating may be applied can vary. Such substrates are those having at least one surface that will accommodate a photochromic coating. Non-limiting examples of such rigid substrates include: paper, glass, ceramics, wood, masonry, textiles, metals and organic polymeric materials. The particular substrate chosen will depend on the particular application that requires both a rigid substrate and a photochromic coating. In a non-limiting embodiment, the substrate is an optical substrate, e.g., a transparent substrate such as a lens. Non-limiting examples of lenses, such as ophthalmic lenses, include plano lenses, semi-finished lenses, finished lenses, single vision lenses, semi-finished single vision lenses, progressive multifocal lenses and finished single vision lenses.

Polymeric substrates that may be used in preparing the photochromic articles of the present invention include organic polymeric materials and glass. As used herein, the term "glass" is defined as being a polymeric substance, e.g., a polymeric silicate. Glass substrates can be of any type suitable for the intended purpose; but is desirably a clear, low colored, transparent glass such as the well-known silica type of glass, particularly soda-lime-silica glass. The nature and composition of various silica glasses is well known in the art. The glass substrate may be one that has been strengthened by either thermal or chemical tempering. Polymeric organic substrates that can be used to prepare articles having a photochromic coating comprising dendritic polymeric acrylate are any of the currently known (or later discovered) plastic materials that are chemically compatible with the photochromic dendritic polymeric acrylate coating and that have a surface that will accommodate such a coating. Non-limiting examples of polymeric organic substrates are the art-recognized synthetic resins that are useful as optical substrates, e.g., organic optical resins that are used to prepare castings for optical applications, such as ophthalmic lenses.

In a non-limiting embodiment, organic substrates that may be used as polymeric organic substrates are polymers, i.e., homopolymers and copolymers, prepared from monomers and mixtures of monomers disclosed in U.S. Pat. No. 5,658,501 from column 15, line 28 to column 16, line 17, which disclosure is incorporated by reference. Such organic substrates can be thermoplastic or thermoset polymeric substrates, e.g., transparent substrates having a refractive index that generally ranges from 1.48 to 1.74.

Non-limiting examples of such monomers and polymers include: polyol(allyl carbonate) monomers, e.g., allyl diglycol carbonates such as diethylene glycol bis(allyl carbonate), which monomer is sold under the trademark CR-39 by PPG Industries, Inc; polyurea-polyurethane (polyurea urethane) polymers, which are prepared, for example, by the reaction of a polyurethane prepolymer and a diamine curing agent (as described in column 1, line 59 to column 6, line 5 of U.S. Pat. No. 6,127,505, which disclosure is incorporated herein by reference), a composition for one such polyurea urethane polymer being sold under the trademark TRIVEX by PPG Industries, Inc; acrylic functional monomers, such as but not limited to,a polyol(meth)acryloyl terminated carbonate monomers diethylene glycol dimethacrylate monomer, ethoxylated phenol methacrylate monomers, ethoxylated trimethylol propane triacrylate monomers, ethylene glycol bismethacrylate monomer, poly(ethylene glycol) bismethacrylate monomers, urethane acrylate monomers, and poly (ethoxylated bisphenol A dimethacrylate) monomers; diisopropenyl benzene monomer; poly(vinyl acetate); poly (vinyl alcohol); poly(vinyl chloride); poly(vinylidene chloride); polyethylene; polypropylene; polyurethanes; polythiourethanes, which include but are not limited to materials such as the MR-6, MR-7 and MR-8 optical resins from Mitsui Toatsu Chemicals, Inc.; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products. In a non-limiting embodiment, the organic polymeric substrate is chemically compatible with the photochromic polymeric coating applied to the surface of the substrate, and in the case of optical applications, the substrate is desirably transparent.

The polymeric organic substrate used to prepare the photochromic articles of the present invention may have a protective coating, e.g., an abrasion-resistant coating, on its surface. For example, commercially available thermoplastic polycarbonate optical lenses are typically sold with an abrasion-resistant coating, e.g., a hard coat, already applied to its surface(s) because the surface tends to be readily scratched, abraded or scuffed. An example of such a lens is a Gentex polycarbonate lens (available from Gentex Optics) that is sold with a hard coat already applied to the polycarbonate surface. As used in this disclosure and claims, the terms "polymeric organic substrate" (or similar terms) or "surface" of such a substrate, is intended to mean and include either the polymeric organic substrate itself or such a substrate with a coating on the substrate. Thus, when reference is made in this disclosure or claims to applying a primer coating or photochromic polymeric coating to the surface of the substrate, such reference includes applying such a coating to the polymeric organic substrate per se or to a coating, e.g., an abrasion-resistant coating, on the surface of the substrate. Hence, the term "substrate" includes substrates having a coating on its surface. Such a coating may be any suitable coating (other than a photochromic coating) and is not limited to an abrasion-resistant coating (hard coat), e.g., any protective coating or other coating that provides one or more additional functional properties, e.g., one or more light modifying functions, to the article of which the substrate is a part.

In a non-limiting embodiment, the substrate may contain within its matrix or on at least a portion of the surface of the substrate a fixed tint, a polarizing material or layer, or a material that provides one or more other functional properties. It is also contemplated that the substrate may have a light modifying function within the matrix of the substrate and a light modifying function on at least a portion of the surface of the optical substrate. In the later case, the light modifying functions within and on the optical substrate complement each other and the photochromic coating comprising the dendritic polymeric acrylate. For example, the substrate matrix may contain a fixed tint and the surface may contain a polarizing material or layer.

The photochromic coating comprising dendritic polymeric acrylate may be applied to only a portion of one or more surfaces of the substrate, but typically it is applied to the entire surface of at least one surface of the substrate. The amount of photochromic coating applied to the chosen surface of the substrate is that amount which provides a sufficient quantity of photochromic material to produce a coating that exhibits a desired change in optical density (AOD) when the cured coating is exposed to ultraviolet (UV) radiation, i.e., a photochromic amount. In a non-limiting embodiment, the change in optical density measured at 22° C. (72° F.) after 30 seconds of UV exposure is at least 0.05, generally at least 0.15, e.g., at least 0.20. In a non-limiting embodiment, the change in optical density after 15 minutes of UV exposure is at least 0.10, generally at least 0.50, e.g., at least 0.70.

In alternate non-limiting embodiments, the amount of active photochromic material used in the photochromic coating may range from 0.5 to 40.0 weight percent, based on the total weight of monomer(s)/resin(s) used to produce the coating. Generally, the concentration of active photochromic material(s) within the photochromic coating may vary from 1.0 to 30 weight percent, generally, from 3 to 20 weight percent, e.g., from 3 to 10 weight percent (based on the total weight of monomer(s)/resin(s) used to produce the coating.) The amount of photochromic material in the coating may range between any combination of these values, inclusive of the recited values.

The thickness of the photochromic coating comprising dendritic polymeric acrylate applied to the surface of the rigid substrate can vary. In a non-limiting embodiment, the photochromic coating has a thickness of at least 3 microns. In alternate non-limiting embodiments, the photochromic coating has a thickness of at least 5 microns, generally at least 10 microns, e.g., at least 20 or 30 microns. In one non-limiting embodiment, the applied photochromic coating has a thickness of not more than 200 microns. In alternate non-limiting embodiments, the applied photochromic coating has a thickness of not more than 100 microns, generally not more than 50 microns, e.g., not more than 40 microns. The thickness of the photochromic coating may range between any combinations of these values, inclusive of the recited values. For example, the thickness of the applied photochromic coating can range from 5 to 50 microns, e.g., 10 or 20 to 40 microns. Desirably, the applied photochromic coating is substantially free of cosmetic defects, such as scratches, pits, spots, cracks, inclusions, etc.

Photochromic materials, e.g., photochromic dyes/compounds or compositions containing such dye/compounds, that may be utilized for the photochromic coating are inorganic and/or organic photochromic compounds and/or substances containing such organic photochromic compounds that are currently known to those skilled in the art (or that are later discovered). The particular photochromic material(s), e.g., compound(s), selected will depend on the ultimate application and the color or hue desired for that application. When two or more photochromic compounds are used in combination, they are generally chosen to complement one another to produce a desired color or hue.

Organic photochromic compounds used in the photochromic coating generally have at least one activated absorption maxima within the visible spectrum of between 300 and 1000, e.g., between 400 and 700, nanometers. The organic photochromic material(s) is incorporated, e.g., dissolved or dispersed, in the coating formulation comprising dendritic polymeric acrylate, and color when activated, e.g., when exposed to ultraviolet radiation.

The inorganic photochromic material generally contains crystallites of silver halide, cadmium halide and/or copper halide. Generally, the halide material is the chloride and bromide. Other inorganic photochromic materials may be prepared by the addition of europium (II) and/or cerium (III) to a mineral glass, such as a soda-silica glass. In a non-limiting embodiment, the inorganic photochromic material(s) is added to molten glass and formed into particles that are incorporated into the coating composition that is used to form the polymeric photochromic coating. Such inorganic photochromic materials are described in the *Kirk Othmer Encyclopedia of Chemical Technology*, 4$^{th}$ Edition, Volume 6, pages 322-325, which disclosure is incorporated by reference.

Non-limiting examples of organic photochromic compounds that may be used in the photochromic coating include pyrans, e.g., benzopyrans, chromenes, e.g., naphthopyrans, such as, naphtho[1,2-b]pyrans, naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57, and U.S. Pat. No. 5,658,501 at column 1, line 64 to column 13, line 36, which disclosures are incorporated herein by reference. Additional non-limiting examples of organic photochromic compounds that may be used include the oxazines, such as benzoxazines, naphthoxazines, and spiro (indoline)pyridobenzoxazines. In a further non-limiting embodiment, additional photochromic materials that may be used include photochromic metal dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent application 2003/0174560 from paragraphs [0025] to [0086], which disclosure is incorporated herein by reference; and mixtures of any of the above-described photochromic materials/compounds.

Further non-limiting examples of organic photochromic compounds, polymerizable photochromic compounds and complementary photochromic compounds that may be used are described in the following U.S. Patents:

U.S. Pat. No. 5,166,345 at column 3, line 36 to column 14, line 3;

U.S. Pat. No. 5,236,958 at column 1, line 45 to column 6, line 65;

U.S. Pat. No. 5,252,742 at column 1, line 45 to column 6, line 65;

U.S. Pat. No. 5,359,085 at column 5, line 25 to column 19, line 55;

U.S. Pat. No. 5,488,119 at column 1, line 29 to column 7, line 65;

U.S. Pat. No. 5,821,287 at column 3, line 5 to column 11, line 39;

U.S. Pat. No. 5,869,658 at column 2, line 5 to column 4, line 37, and column 11, lines 36-57;

U.S. Pat. No. 6,113,814 at column 2, line 23 to column 23, line 29;

U.S. Pat. No. 6,153,126 at column 2, line 18 to column 8, line 60;

U.S. Pat. No. 6,296,785 at column 2 line 47 to column 31, line 5;

U.S. Pat. No. 6,348,604 at column 3, line 26 to column 17, line 15;

U.S. Pat. No. 6,353,102 at column 1, line 62 to column 11, line 64; and

U.S. Pat. No. 6,630,597 at column2, line 24 to column 4, line 32, and column 9, lines 3-17.

The foregoing disclosures are incorporated herein by reference. In addition, it is contemplated that organic photochromic materials such as photochromic pigments and photochromic compounds encapsulated in metal oxides may be used in the photochromic coating. See, for example, the materials described in U.S. Pat. Nos. 4,166,043 and 4,367,170.

The photochromic coating contains at least one photochromic material. In an alternate non-limiting embodiment, the photochromic coating may contain a mixture of two or more photochromic materials. Mixtures of photochromic materials can be used to attain certain activated colors such as a near neutral gray or near neutral brown. See, for example, U.S. Pat. No. 5,645,767, column 12, line 66 to column 13, line 19, which describes the parameters that define neutral gray and brown colors. Such disclosure is incorporated herein by reference.

Compatible (chemically and color-wise) tints, e.g., dyes, may also be added to the photochromic coating formulation or applied to the plastic substrate for medical reasons or for reasons of fashion, e.g., to achieve a more aesthetic result. The particular dye selected can vary and will depend on the aforesaid need and result to be achieved. In a non-limiting embodiment, the dye may be selected to complement the color resulting from the activated photochromic materials used, e.g., to achieve a more neutral color or absorb a particular wavelength or incident light. In another non-limiting embodiment, the dye can be selected to provide a desired hue to the substrate and/or coating when the photochromic coating is in an inactivated state.

In a further contemplated non-limiting embodiment, an abrasion-resistant coating may be superposed, e.g., superimposed, on the photochromic dendritic polymeric acrylate coating. Abrasion-resistant coatings (hard coats), particularly abrasion-resistant coatings comprising organo silane material(s), are used to protect surfaces from abrasion, scratches, etc. Organo silane-containing abrasion-resistant coatings, often referred to as hard coats or silane-based hard coatings, are well known in the art, and are commercially available from various manufacturers, such as SDC Coatings, Inc. and PPG Industries, Inc. Reference is made to column 5, lines 1-45 of U.S. Pat. No. 4,756,973, and to column 1, lines 58 through column 2, line 8, and column 3, line 52 through column 5, line 50 of U.S. Pat. No. 5,462,806 which disclosures describe organo silane hard coatings. Such disclosures are incorporated herein by reference. Reference is also made to U.S. Pat. Nos. 4,731,264, 5,134,191, 5,231,156, 6,808,812 and International Patent Publication WO 94/20581 for disclosures of hard coatings.

Other coatings that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings may also be used as the abrasion-resistant coating.

In a non-limiting embodiment, the hard coat may be prepared from a composition comprising from 35 to 95 weight percent, as calculated solids, of at least one organo silane monomer represented by the following empirical formula X:

$$R^1SiW_3 \qquad\qquad X$$

wherein $R^1$ is glycidoxy($C_1$-$C_{20}$)alkyl, desirably glycidoxy ($C_1$-$C_{10}$)alkyl, and more desirably, glycidoxy ($C_1$-$C_4$)alkyl; W is hydrogen, halogen, hydroxy, $C_1$-$C_5$ alkoxy, $C_1$-$C_5$ alkoxy($C_1$-$C_5$)alkoxy, $C_1$-$C_4$ acyloxy, phenoxy, $C_1$-$C_3$ alkylphenoxy, or $C_1$-$C_3$ alkoxyphenoxy, said halogen being bromo, chloro or fluoro. Generally, W is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halogen is chloro or fluoro. In one non-limiting embodiment, W is hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy.

Non-limiting examples of silane monomers represented by general formula X include: glycidoxymethyltriethoxysilane, glycidoxymethyltrimethoxysilane, alpha-glycidoxyethyltrimethoxysilane, alpha-glycidoxyethyltriethoxysilane, alpha-glycidoxypropyltrimethoxysilane, alpha-glycidoxypropyltriethoxysilane, alpha-glycidoxypropyltrimethoxysilane, alpha-glycidoxypropyltriethoxysilane, beta-glycidoxyethyltrimethoxysilane, beta-glycidoxyethyltriethoxysilane, beta-glycidoxypropyltrimethoxysilane, beta-glycidoxypropyltriethoxysilane, gamma-glycidoxypropyltrimethoxysilane, gamma-glycidoxypropyltriethoxysilane, gamma-glycidoxypropyltripropoxysilane, gamma-glycidoxypropyltrimethoxysilane, hydrolyzates of such silane monomers, and mixtures of such silane monomers and hydrolyzates thereof.

The abrasion-resistant coating (hard coat) can be applied to the photochromic coating by, for example, conventional application techniques, e.g., spin coating, dip coating, etc. The thickness of the abrasion resistant coating may vary. In one non-limiting embodiment, the thickness of the abrasion resistant coating may range from 0.5 to 10 microns. Prior to applying the hard coat, e.g., the organo silane hard coat, the photochromic coating or coating to which the hard coat is applied may be treated to enhance its receptivity of and adhesion to the hard coat. Such treatments, e.g., the plasma and corona discharge treatments described before, can be used.

In a further non-limiting embodiment, additional coatings, such as antireflective coatings, may be applied to the hard coat layer. Non-limiting examples of antireflective coatings are described in U.S. Pat. No. 6,175,450 and International Patent Publication WO 00/33111.

The present invention is more particularly described in the following examples, which are intended as illustrative only, since numerous modifications and variations therein will be apparent to those skilled in the art. In the examples, percentages are reported as weight percent, unless otherwise specified. Materials, such as monomers, catalysts, initiators, etc., which are identified in one example by a lower case letter in parenthesis and which are used in other examples, are identified in the subsequent examples with the same lower case letter.

In the following examples, 72 mm plano lenses prepared from diethylene glycol bis(allyl carbonate) were used.

EXAMPLE 1

Plano test lenses were cleaned with soap and water, dried and then treated with an oxygen plasma for I minute using a Plasmatech machine at a power setting of 100 Watts while introducing oxygen at a rate of 100 ml/min into the vacuum chamber of the Plasmatech machine. The lenses were then rinsed with deionized water and dried with air. A photochromic dendritic polyester acrylate coating composition was applied to the plasma treated lenses by spin coating (targeting a 0.18 gram wet weight) and cured by placing the coated lenses on the conveyor belt of an EYE Ultraviolet light apparatus where the lenses were exposed to ultraviolet light (V-bulbs) for approximately 30 seconds. The components of the coating composition and their amounts are tabulated in Table I. The photochromic coating was approximately 30 microns thick.

TABLE I

Formulation [1]

| Component/ | Grams |
|---|---|
| NXT 7022 Dendritic Polyester Methacrylate (a) | 10.0 |
| Irganox-245 antioxidant (b) | 0.21 |
| HALS stabilizer (c) | 0.39 |
| N-methyl pyrrolidinone | 1.5 |
| Photochromic Material (d) | 0.6 |
| FC-431 (e) surfactant | 0.015 |

TABLE I-continued

Formulation [1]

| Component/ | Grams |
|---|---|
| BAPO (f) | 0.03 |
| LUCIRIN TPO Photoinitiator (g) | 0.02 |

(a) NXT-7022 is reported by its supplier to be a dendritic polyester methacrylate prepared by methacrylating a polyester polyol having 16 terminal hydroxyl groups, of which approximately 85 to 90 percent on average are converted to methacrylate groups.
(b) Antioxidant available from Ciba-Geigy.
(c) FA-711 MM hindered amine light stabilizer available from Hitachi Chemical, Co.
(d) A mixture of naphthopyran photochromic materials in proportions designed to give a gray tint to the coating when activated by UV radiation.
(e) Fluorinated surfactant available from the 3M Company.
(f) [bis(2,4,6-trimethylbenzoyl)phenyl phosphine oxide] photoinitiator (Irgacure 819 from Ciba-Geigy).
(g) Diphenyl(2,4,6-trimethylbenzoyl phosphine oxide) photoinitiator available from Aldrich.
[1] The photochromic materials were combined with the N-methyl pyrrolidinone. The mixture was stirred at 60° C. for approximately one hour. All of the remaining components (with the exception of the NXT-7022 resin and FC-431) of the coating composition were then added and the resultant mixture (Solution A) stirred at room temperature until well blended. Thereafter, the NXT-7022 resin and FC-431 were mixed with Solution A and the resultant coating composition mixed until well blended.

The test lenses were exposed to ultraviolet light and found to change color. When the source of UV light was removed, the lenses returned to their original clear state. Two of the test lenses were tested for photochromic response on an optical bench at 72° F. (22° C.). The average change in optical density value ($\Delta OD$) at 30 seconds, e.g., the change in optical density from the unactivated or bleached state to the activated or darkened state, for the lenses was 0.300; the average change in the optical density value at 900 seconds was 0.765. The average bleach rate (time to fade-photopic T½) was 209 seconds and the average second bleach rate (time to fade-$2^{nd}$ photopic T½) was 743 seconds. The change in optical density ($\Delta OD$) is determined according the formula $\Delta OD = \log(\% Tb/\% Ta)$, where % Tb is the percent transmittance in the bleached state, % Ta is the percent transmittance in the activated, and the logarithm is to the base 10. The bleach rate (T½) is the time interval in seconds for the $\Delta OD$ of the activated lens to reach one-half of the highest $\Delta OD$ after removal of the source of activating radiation. The second bleach rate ($2^{nd}$ T½) is the time interval in seconds for the $\Delta OD$ of the activated lens to reach one-quarter of the highest $\Delta OD$ after removal of the source of activating radiation.

EXAMPLE 2

The procedures of Example 1 were followed except that the resin used for the coating composition comprised 70 weight percent of NXT-7022 dendritic polyester methacrylate and 30 weight percent of Bisphenol A ethoxylate dimethacrylate having approximately 30 ethoxy units per molecule.

The test lenses were exposed to ultraviolet light and found to change color. When the source of UV light was removed, the lenses returned to their original clear state. The test lenses were tested for photochromic response on an optical bench at 72° F. (22° C.). The average change in optical density value ($\Delta OD$) at 30 seconds for the lenses was 0.462; the average change in the optical density value at 900 seconds was 0.717. The average bleach rate (time to fade-photopic T½) was 57 seconds and the average second bleach rate (time to fade-$2^{nd}$ photopic T½) was 159 seconds.

EXAMPLE 3

The procedure of Example 1 was followed except that the resin used for the coating composition comprised 50 weight percent of NXT 7022 dendritic polyester methacrylate, and 50 weight percent of Bisphenol A ethoxylate dimethacrylate having approximately 30 ethoxy units per molecule. The test lenses were tested for photochromic response on an optical bench at 72° F. (22° C.). The average change in optical density value ($\Delta OD$) at 30 seconds for the lenses was 0.570; the average change in the optical density value at 900 seconds was 0.744. The average bleach rate (time to fade-photopic T½) was 37 seconds and the average second bleach rate (time to fade-$2^{nd}$ photopic T½) was 86 seconds.

EXAMPLE 4

The procedure of Example 1 was followed except that the resin used for the coating composition comprised 30 weight percent of NXT-7022 dendritic polyester methacrylate and 70 weight percent of Bisphenol A ethoxylate dimethacrylate having approximately 30 ethoxy units per molecule. The test lenses were tested for photochromic response on an optical bench at 72° F. (22° C.). The average change in optical density value ($\Delta OD$) at 30 seconds for the lenses was 0.601; the average change in the optical density value at 900 seconds was 0.707. The average bleach rate (time to fade-photopic T½) was 28 seconds and the average second bleach rate (time to fade-$2^{nd}$ photopic T½) was 60 seconds.

EXAMPLE 5

The procedure of Example 1 was followed except that the coating composition used was that found in Table II.

TABLE II

| Component/ | Grams |
|---|---|
| PRO-5249 Dendritic Polyester Acrylate (h) | 6.0 |
| PC-1122 DMA (i) | 4.0 |
| Irganox-245 antioxidant (b) | 0.3 |
| HALS stabilizer (j) | 0.2 |
| N-methyl pyrrolidinone | 1.5 |
| Photochromic Material (k) | 0.6 |
| FC-431 (e) | 0.015 |
| BAPO (f) | 0.03 |
| LUCIRIN TPO Photoinitiator (g) | 0.02 |

(h) PRO-5249 is reported by its supplier to be a 50/50 blend of neopentylglycol-2-propoxylated diacrylate and a dendritic polyester acrylate in which approximately 13 of the 16 terminal hydroxyl groups have been acrylated.
(i) Dimethacrylate of PC-1122 (an aliphatic polycarbonate diol reported by its supplier (Stahl) to be polyhexamethylene dicarbonate) by reaction of the diol with isocyanato ethyl methacrylate).
(j) TINUVIN-622 hindered amine light stabilizer available from Ciba-Geigy
(k) A mixture of naphthopyran photochromic materials in proportions designed to give a gray tint to the coating when activated by UV radiation.

The test lenses were tested for photochromic response on an optical bench at 72° F. (22° C.). The average change in optical density value ($\Delta OD$) at 30 seconds for the lenses was 0.506; the average change in the optical density value at 900 seconds was 0.789. The average bleach rate (time to fade-photopic T½) was 79 seconds and the average second bleach rate (time to fade-$2^{nd}$ photopic T½) was 233 seconds.

EXAMPLE 6

The procedures of Example 5 were followed except that the resin used for the coating composition comprised 45 weight percent of PRO-5249 and 55 weight percent of PC-1122 DMA. The test lenses were tested for photochromic response on an optical bench at 72° F. (22° C.). The average change in optical density value (ΔOD) at 30 seconds for the lenses was 0.542; the average change in the optical density value at 900 seconds was 0.794. The average bleach rate (time to fade-photopic T½) was 67 seconds and the average second bleach rate (time to fade-$2^{nd}$ photopic T½) was 190 seconds.

Although the present invention has been described with reference to specific details of certain embodiments thereof, it is not intended that such details should be regarded as limitations upon the scope of the invention except insofar as they are included in the accompanying claims.

What is claimed is:

1. An article comprising:
    (a) a rigid substrate having at least one surface suitable for accommodating a photochromic coating, and
    (b) a transparent photochromic coating on at least a portion of said surface of said substrate, said coating formed from a photochromic coating composition comprising dendritic polymeric acrylate, from 0.5 to 16 weight percent of at least one adhesion promoting organo-silane material, and a photochromic amount of at least one photochromic material.

2. The article of claim 1 wherein the dendritic polymeric acrylate is chosen from acrylate modified dendrimers chosen from epoxide-amine dendrimers, carbosilane-based dendrimers, amido amine dendrimers, polysulfide dendrimers, polysiloxane dendrimers, polyaminosulfide dendrimers, polyether dendrimers, polythioether dendrimers, polyester dendrimers, polyester amide dendrimers, or poly (ether ketone) dendrimers.

3. The article of claim 1 wherein the dendritic polymeric acrylate is dendritie polyester aerylate.

4. The article of claim 3 wherein the dendritic polyester acrylate is prepared from a liquid composition prepared by acrylating a dendritic polyester macromolecule and an organic alcohol having a molecular weight of less than 2000.

5. The article of claim 1 wherein the substrate is chosen from substrates prepared from polymerizable compositions comprising allyl diglycol carbonate monomer(s), substrates prepared from polymerizable compositions comprising acrylic functional monomers, substrates prepared from compositions comprising thermoplastic polycarbonate, substrates prepared from compositions comprising poly(urea urethane), substrates prepared from compositions comprising polythiourethanes, substrates prepared from compositions comprising polyurethanes, or substrates prepared from compositions comprising the reaction product of polyflmnctional isocyanate(s) and/or isothiocyanate(s) with polythiol or poly-episulfide monomer(s)

6. The article of claim 1 wherein the transparent photochromic coating is prepared from a curable coating composition comprising dendritic polyester acrylate and at least one other radiation curable acrylic material.

7. The article of claim 6 wherein the at least one other radiation curable acrylic material is chosen from monoacrylates and polyacrylates.

8. The article of claim 7 wherein the polyacrylate is a diacrylate, triacrylate or mixture of diacrylate(s) and triacrylate(s).

9. The article of claim 6 wherein the weight ratio of the dendritic polyester acrylate to the other radiation curable acrylic monomeric material(s) ranges from 90:10 to 10:90.

10. The article of claim 6 wherein the weight ratio of the dendritic polyester acrylate to the other radiation curable acrylic monomeric material(s) ranges from 70:30 to 30:70.

11. The article of claim 6 wherein the curable composition used to prepare the photochromic coating further comprises at least one other radiation curable monomeric material containing polymerizable group(s) other than acrylic functional groups, said at least one other radiation curable monomeric material being present in amounts of up to 20 weight percent of said composition.

12. The article of claim 1 wherein the photochromic material comprises at least one organic photochromic material.

13. The article of claim 12 wherein the organic photochromic material is chosen from materials comprising pyrans, chromenes, oxazines, fulgides, fulgimides, metal dithizonates, diarylethenes and mixtures of such organic photochromic materials.

* * * * *